United States Patent Office 3,753,943
Patented Aug. 21, 1973

3,753,943
1,2-POLYBUTADIENE COMPOSITION STABILIZED WITH PHENOLIC ACRYLATES OR ACRYLAMIDES
Haruo Ueno, Hideo Ishikawa, and Hisawaki Hamada, Ichihara, and Takashi Watanabe, and Kunio Imamora, Tokyo, Japan, assignors to UBE Industries, Ltd., and Ouchishinko Chemical Industrial Company, Tokyo, Japan
No Drawing. Filed Dec. 21, 1971, Ser. No. 210,596
Claims priority, application Japan, Dec. 26, 1970, 45/118,731
Int. Cl. C07c 107/30
U.S. Cl. 260—32.6 A          9 Claims

ABSTRACT OF THE DISCLOSURE

It has been found that undesired deterioration of 1,2-polybutadiene under the influence of heat, oxygen, ozone and light can be advantageously prevented by the incorporation into 1,2-polybutadiene of a small amount of a compound represented by the formula:

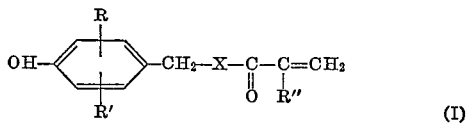

(I)

wherein X is a —OCH$_2$NH—, —NH— or —O— group, each of R and R' is an alkyl group having 1 to 4 carbon atoms and R'' is a hydrogen atom or a methyl group.

---

The invention relates to the stabilization of 1,2-polybutadiene and more particularly, a stabilized 1,2-polybutadiene composition having the valuable property of being stabilized against deterioration during storing and shaping of 1,2-polybutadiene and during use of a product made therefrom.

It is well-known that polyolefins, polyamides and various rubber-like polymers readily deteriorate under the influence of heat, oxygen, ozone, light and the like during storing and processing of these polymers and during the use of products made therefrom, thereby leading to deterioration of the physical properties such as coloration, opaqueness, surface-cracking, reduction of the tensile strength and the like. In order to obviate these defects, many attempts have been made heretofore which generally involve the incorporation of a stabilizer such as amine, phenol or sulfide compounds. However, amine compounds generally color or discolor these polymers and result in an unattractive appearance of the product. Therefore, amine compounds are of no practical use and consequently, phenol compounds and sulfide compounds are used in practice.

However, a polymer having unsaturated side chains such as vinyl groups, for example, 1,2-polybutadiene is very unstable to heat, oxygen, etc. and therefore, even though such a conventional stabilizer is incorporated thereinto, said polymer is subjected to coloration, cross-linking or other deterioration during storing and processing thereof and during use of products made therefrom. Thus, 1,2-polybutadiene can be neither satisfactorily stored nor processed and is not widely used.

It has now been found that the undesired deterioration of 1,2-polybutadiene under the influence of heat, oxygen, ozone, light and the like during storing and processing thereof and during use of products made therefrom can be advantageously prevented by the incorporation into the 1,2-polybutadiene of a small, but effective, stabilizing amount of a compound represented by the formula;

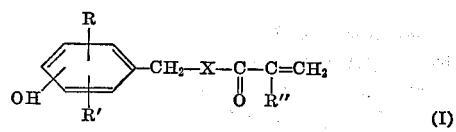

(I)

wherein X is a —OCH$_2$NH—, —NH— or —O— group, each of R and R' is an alkyl group having 1–4 carbon atoms and R'' is a hydrogen atom or a methyl group.

1,2-polybutadiene to which the present invention relates means polybutadiene containing at least 30%, particularly at least 70%, of the 1,2-structure portion such as syndiotactic 1,2-polybutadiene, isotactic 1,2-polybutadiene, rubber-like 1,2-polybutadiene, liquid 1,2-polybutadiene and the like. These may be used singly or as a mixture with each other or with other polyolefins, e.g. polyethylene and polypropylene.

The compound represented by the above Formula I is divisible into the following three types:

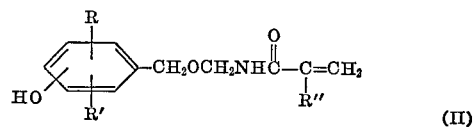

(II)

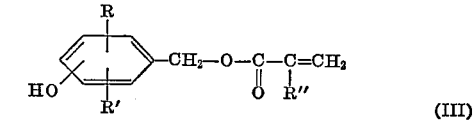

(III)

(IV)

wherein each of R and R' is an alkyl group having 1–4 carbon atoms and R'' is a hydrogen atom or a methyl group.

The compounds represented by Formula II include, for example, acrylaminomethyl-(3,5-di-tert-butyl-4-hydroxybenzyl) ether,
acrylaminomethyl-(2-hydroxy-3,5-di-tert-butylbenzyl) ether,
acrylaminomethyl-(2-hydroxy-3-tert-butyl-5-methylbenzyl) ether,
acrylaminomethyl-(3,5-dimethyl-4-hydroxybenzyl) ether,
acrylaminomethyl-(2-hydroxy-3-tert-butyl-5-ethylbenzyl) ether,
acrylaminomethyl-(3-methyl-4-hydroxy-t-tert-butylbenzyl) ether,
methacrylaminomethyl-(3,5-di-tert-butyl-4-hydroxybenzyl) ether,
methacrylaminomethyl-(2-hydroxy-3,5-di-tert-butylbenzyl) ether,
methacrylaminomethyl-(2-hydroxy-3-tert-butyl-5-methylbenzyl) ether,
methacrylaminomethyl-(3,5-dimethyl-4-hydroxybenzyl) ether, methacrylaminomethyl-(2-hydroxy-3-tert-butyl-5-ethyl-benzyl) ether,
methacrylaminoemthyl-(3-methyl-4-hydroxy-5-tert-butylbenzyl) ether,
and the like.

The compounds represented by Formula III include, for example, (4-hydroxy-3,5-di-tert-butylbenzyl) acrylate,
(2-hydroxy-3,5-di-tert-butylbenzyl) acrylate,
(2-hydroxy-3-tert-butyl-5-methylbenzyl) acrylate,
(4-hydroxy-3,5-di-methylbenzyl) acrylate,
(2-hydroxy-3-tert-butyl-5-ethylbenzyl) acrylate,
(4-hydroxy-3-methyl-5-tert-butylbenzyl) acrylate,
(4-hydroxy-3,5-di-tert-butylbenzyl) methacrylate,
(2-hydroxy-3,5-di-tert-butylbenzyl) methacrylate,
(2-hydroxy-3-tert-butyl-5-methylbenzyl) methacrylate,
(4-hydroxy-3,5-di-methylbenzyl) methacrylate,
(2-hydroxy-3-tert-butyl-5-ethylbenzyl) methacrylate,
(4-hydroxy-3-methyl-5-tert-butylbenzyl) methacrylate,
and the like.

The compounds represented by Formula IV include, for example, (4-hydroxy-3,5-di-tert-butylbenzylamino) acrylate,
(2-hydroxy-3,5-di-tert-butylbenzylamino) acrylate,
(2-hydroxy-3-tert-butyl-5-methylbenzylamino) acrylate,
(4-hydroxy-3,5-di-methylbenzylamino) acrylate,
(2-hydroxy-3-tert-butyl-5-ethylbenzylamino) acrylate,
(4-hydroxy-3-methyl-5-tert-butylbenzylamino) acrylate,
(4-hydroxy-3,5-di-tert-butylbenzylamino) methacrylate,
(2-hydroxy-3,5-di-tert-butylbenzylamino) methacrylate,
(2-hydroxy-3-tert-butyl-5-methylbenzylamino) methacrylate,
(4-hydroxy-3,5-di-methylbenzylamino) methacrylate,
(2-hydroxy-3-tert-butyl-5-ethylbenzylamino) methacrylate,
(4-hydroxy-3-methyl-5-tert-butylbenzylamino) methacrylate, and the like.

The compounds represented by Formulae II, III and IV can be prepared in the following manner:

The compounds represented by Formula II may be synthesized by a dehydration reaction between dialkylhydroxybenzyl alcohol and N-methylolacrylamide or N-methylolmethacrylamide. For example, acrylaminomethyl-(3,5-di-tert-butyl-4-hydroxybenzyl) ether may be synthesized as follows: 3,5-di-tert-butyl-4-hydroxybenzyl alcohol and N-methylolacrylamide are reacted with each other at a temperature of 55° to 60° C. in a toluene medium containing p-toluenesulfonic acid as catalyst and phenothiazine as polymerization inhibitor. The toluene layer so formed is washed with water and separated from an aqueous layer and then, dried. Finally, after removing toluene, the residue is recrystallized using isopropanol to recover the pure compound.

The compounds represented by Formula III may be synthesized, for example, by a dehydration reaction between dialkylhydroxybenzyl alcohol and acrylic acid or methacrylic acid, or by a de-sodium halogenide reaction between dialkylhydroxybenzyl halide and sodium acrylate or sodium methacrylate. A lower alkyl ester of acrylic acid or methacrylic acid may be used instead of the acrylic acid or methacrylic acid in the above reaction.

The compounds represented by Formula IV may be synthesized, for example, by a dehydration reaction between dialkylphenol and methylolacrylamide or methylolmethacrylamide, a dehydration reaction between dialkylhydroxybenzyl alcohol and acrylamide or methacrylamide, a dehydration reaction between dialkylhydroxybenzylamine and acrylic acid or methacrylic acid, or a de-hydrogen halogenide reaction between dialkylhydroxybenzylamine and acrylic acid halide or methacrylic acid halide. A lower alkyl ester of acrylic acid or methacrylic acid may also be used instead of the acrylic acid or methacrylic acid in the above reactions. Further, the compounds represented by Formula IV may be synthesized for example by reaction between the three compounds; dialkylphenol and acrylamide or methacrylamide and formaldehyde.

The compounds represented by the Formula I may be used singly or as mixtures thereof. Only a very small amount of the compound needs to be incorporated into 1,2-polybutadiene in order for some benefit to be obtained. In general, at least 0.01 part by weight, based on 100 parts by weight of 1,2-polybutadiene, of the compound should be present in the resulting stabilized composition. While there is apparently no critical upper limit with regard to the amount of the compound to be incorporated, at most 10 parts by weight, based on 100 parts by weight of 1,2-polybutadiene, of the compound should preferably be incorporated because of cost considerations. It is preferred that the amount of the compound to be incorporated is within the range of 0.05 to 10 parts by weight.

In the practice of the present invention, it has been found that, when a compound represented by Formula I is used together with a fatty acid diethanolamide represented by the formula:

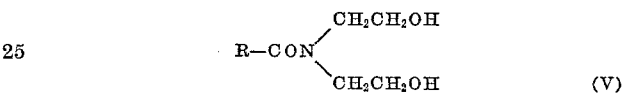

$$R-CON\begin{matrix}CH_2CH_2OH\\CH_2CH_2OH\end{matrix} \quad (V)$$

wherein R is an alkyl group having 8 to 20 carbon atoms, the compound far more effectively stabilizes 1,2-polybutadiene. Preferable fatty acid diethanolamides represented by Formula V include for example lauryl diethanolamide, palmityl diethanolamide and stearyl diethanolamide, which are generally known as a lubricant such as Dianol 300 (the main ingredient is lauryl diethanolamide, made by Daiichi Kogyo Seiyaku K. K., Japan) and Tohol N-230X (the main ingredient is lauryl diethanolamide, made by Toho Kagaku K. K., Japan). The amount of the fatty acid diethanolamide used is preferably within the range of 0.05 to 10 parts by weight based on 100 parts by weight of 1,2-polybutadiene. The ratio by weight of the fatty acid diethanolamide to the compound represented by Formula I is preferably 0.2 to 5.

Further, the compounds represented by Formula I may be used together with other known additives, if desired, such as a lubricant, antioxidant, ultraviolet absorber, coloration inhibitor, surface active agent, plasticizer and the like. In general, these additives are not subjected to heat sublimation and extraction, and cause little or no discoloration or contamination of 1,2-polybutadiene. The amount of the additive used is preferably within the range of 0.05 to 10 parts by weight based on 100 parts by weight of 1,2-polybutadiene.

The particular manner whereby the compound represented by the Formula I and the additives are incorporated into 1,2-polybutadiene is not critical. The compound and the additives may be added in any known manner.

The present invention will be further illustrated with reference to examples and comparative examples, in which all "parts" are parts by weight.

The degree of the deterioration, crosslinking, etc. was designated by the maximum number of cycles achieved in a repeated shaping test wherein a film was shaped from the pulverized material of a film prepared in the preceding shaping test. The melt flow rate was determined using a commercially available melt indexer having a nozzle of 2 mm. diameter at a temperature of 230° C. and a pressure of 1.2 kg./cm.$^2$ (gauge pressure). The molecular weight was determined at a temperature of 130° C. using a membrane osmometer. The content of 1,2-structure portion in polybutadiene was determined on the tablet specimen prepared from KBr powder and polybutadiene powder in accordance with infrared absorption spectrum analysis technique R, Hampton; Analytical Chemistry 21, 923 (1949).

EXAMPLE 1

A hundred parts of finely divided syndiotatic 1,2-polybutadiene (molecular weight, 140,000) powder and 1 part of white acrylaminomethyl-(3,5-di-tert-butyl-4-hydroxybenzyl) ether (M.P., 92° C.) were uniformly mixed and charged into a press shaping machine. In the machine, the mixture was maintained at a temperature of 240° C. and at a pressure of 200 kg./cm.$^2$ (gauge pressure) for 10 minutes and shaped into a film thereby. After being cut into small pieces, the film was charged into the press forming machine and shaped into a film again under the same conditions as above. The shaping could be repeated 6 times, but could not be repeated 7 times.

EXAMPLE 2

The procedure of Example 1 was repeated wherein white acrylaminomethyl-(2-hydroxy-3,5-di-tert-butylbenzyl) ether (M.P. 117° C.) was used in place of acrylaminomethyl-(3,5-di-tert-butyl - 4 - hydroxybenzyl) ether with all other conditions remaining the same. The maximum number of cycles of the shaping was 5.

EXAMPLE 3

The procedure of Example 1 was repeated wherein white acrylaminomethyl-(2-hydroxy-3-tert-butyl-5-methylbenzyl) ether (M.P. 126° C.) was used in place of acrylaminomethyl-(3,5-di-tert-butyl - 4 - hydroxybenzyl) ether with all other conditions remaining the same. The maximum number of cycles of the shaping was 5.

EXAMPLE 4

The procedure of Example 1 was repeated wherein white acrylaminomethyl-(3,5-dimethyl-4-hydroxybenzyl) ether (M.P., 76° C.) was used in place of acrylaminomethyl-(3,5-di-tert-butyl-4-hydroxybenzyl) ether with all other conditions remaining the same. The maximum number of cycles of the shaping was 5.

EXAMPLE 5

The procedure of Example 1 was repeated wherein white methacrylaminomethyl-(3,5-di-tert-butyl-4-hydroxybenzyl) ether was used in place of acrylaminomethyl-(3,5-di-tert-butyl-4-hydroxybenzyl) ether with all other conditions remaining the same. The maximum number of cycles of the shaping was 6.

EXAMPLE 6

The procedure of Example 1 was repeated wherein white (4-hydroxy-3,5-di-tert-butylbenzyl) acrylate (M.P., 69° C.) was used in place of acrylaminomethyl-(3,5-di-tert-butyl-4-hydroxybenzyl) ether with all other conditions remaining the same. The maximum number of cycles of the shaping was 6.

EXAMPLE 7

The procedure of Example 1 was repeated wherein (2-hydroxy-3-tert-butyl-5-methylbenzyl) acrylate was used in place of acrylaminomethyl-(3,5-di-tert-butyl-4-hydroxybenzyl) ether with all other conditions remaining the same. The maximum number of cycles of the shaping was 5.

EXAMPLE 8

The procedure of Example 1 was repeated wherein (4-hydroxy-3,5-dimethylbenzyl) acrylate was used in place of acrylaminomethyl-(3,5-di-tert-butyl-4-hydroxybenzyl) ether with all other conditions remaining the same. The maximum number of cycles of the shaping was 6.

EXAMPLE 9

The procedure of Example 1 was repeated wherein (4-hydroxy-3,5-di-tert-butylbenzyl) methacrylate was used in place of acrylaminomethyl-(3,5-di-tert-butyl-4-hydroxybenzyl) ether with all other conditions remaining the same. The maximum number of cycles of the shaping was 6.

EXAMPLE 10

The procedure of Example 1 was repeated wherein (4-hydroxy-3,5-di-tert-butylbenzylamino) acrylate (M.P., 115° C.) was used in place of acrylaminomethyl-(3,5-di-tert-butyl-4-hydroxybenzyl) ether with all other conditions remaining the same. The maximum number of cycles of the shaping was 5.

EXAMPLE 11

The procedure of Example 1 was repeated wherein (2-hydroxy-3-tert-butyl-5-methylbenzylamino) acrylate was used in place of acrylaminomethyl-(3,5-di-tert-butyl-4-hydroxybenzyl) ether with all other conditions remaining the same. The maximum number of cycles of the shaping was 4.

EXAMPLE 12

The procedure of Example 1 was repeated wherein (4-hydroxy-3,5-di-methylbenzylamino) acrylate was used in place of acrylaminomethyl-(3,5-di-tert-butyl-4-hydroxybenzyl) ether with all other conditions remaining the same.

EXAMPLE 13

The procedure of Example 1 was repeated wherein (4-hydroxy - 3,5 - di - tert -butylbenzylamino) methacrylate (M.P., 113° C.) was used in place of acrylaminomethyl-(3,5-di-tert-butyl-4-hydroxybenzyl) ether with all other conditions remaining the same. The maximum number of cycles of the shaping was 5.

COMPARATIVE EXAMPLES 1–3

The procedure of Example 1 was repeated wherein various compounds as listed in Table 1 were used in place of acrylaminomethyl-(3,5-di-tert-butyl-4-hydroxybenzyl) ether, respectively, with all other conditions remaining the same. The maximum numbers of cycles of the shaping are shown in Table 1.

TABLE 1

| Comparative Ex. No. | Compound | Amount of the compound added (parts) | Maximum number of cycles |
|---|---|---|---|
| 1 | 2,2'-methylenebis(4-methyl-6-tert-butylphenol). | 1 | 2 |
| 2 | 2,6-di-tert-butyl-p-methylphenol. | 1 | 1 |
| 3 | 2,2'-methylenebis(4-methyl-6-tert-butylphenol). Plus tris(nonylphenyl) phosphite. | 1<br>1 | 2<br>2 |

From a comparison between Examples 1–13 and Comparative Examples 1–3, it is evident that the stabilizers of the present invention are far superior to conventional stabilizers.

EXAMPLE 14

100 parts of finely divided syndiotactic 1,2-polybutadiene (molecular weight, 6,000) powder and 1 part of acrylaminomethyl-(3,5 - di - tert-butyl-4-hydroxybenzyl) ether were uniformly mixed. The mixture exhibited a melt flow rate of 36.0. The mixture was charged into a press forming machine and then, maintained at a temperature of 240° C. and at a pressure of 200 kg./cm.$^2$ (gauge pressure) therein for 1 minute and shaped into a film thereby. The film exhibited a melt flow rate of 34.0.

EXAMPLE 15

The procedure of Example 14 was repeated wherein (4-hydroxy-3,5-di-tert-butylbenzyl) acrylate was used in place of acrylaminomethyl-(3,5-di-tert-butyl-4-hydroxybenzyl) ether with all other conditions remaining the same. The melt flow rates of the mixture before shaping and the film after shaping were 34.0 and 33.0, respectively.

EXAMPLE 16

The procedure of Example 14 was repeated wherein (4-hydroxy-3,5-di-tert-butylbenzylamino) acrylate was used in place of acrylaminomethyl-(3,5-di-tert-butyl-4-hydroxybenzyl) ether with all other conditions remaining the same. The melt flow rates of the mixture before shaping and the film after shaping were 34.0 and 31.0, respectively.

COMPARATIVE EXAMPLE 4

The procedure of Example 14 was repeated wherein 2,2'-methylenebis(4-methyl-6-tert-butylphenol) was used in place of acrylaminomethyl-(3,5-di-tert-butyl-4-hydroxybenzyl) ether with all other conditions remaining the same to prepare a film thereby. The melt flow rate of the film could not be determined because the material did not flow out from the nozzle due to the deterioration.

EXAMPLES 17-19

The procedure of Example 1 was repeated wherein, in place of 100 parts of the finely divided syndiotactic 1,2-polybutadiene (molecular weight, 140,000) powder, a mixture of 70 parts of the same powder and 30 parts of the materials as listed in Table 2 was used with all other conditions remaining the same. The maximum number of cycles of the shaping are shown in Table 2.

TABLE 2

| Ex. No. | Material used in addition to syndiotactic 1,2-polybutadiene powder | Maximum number of cycles |
|---|---|---|
| 17 | Liquid 1,2-polybutadiene (molecular weight 2,000; 1,2-content, 91%). | 8 |
| 18 | Di-2-ethylhexyl phthalate (plasticizer) | 10 |
| 19 | Polypropylene (melt flow rate, 1.0) | 6 |

EXAMPLES 20-22

The procedure of Example 6 was repeated wherein, in substitution for 100 parts of the finely divided syndiotactic 1,2-polybutadiene (molecular weight, 140,000) powder, a mixture of 70 parts of the same powder and 30 parts of the material listed in Table 3 was used with all other conditions remaining the same. The maximum number of cycles of the shaping are shown in Table 3.

TABLE 3

| Ex. No. | Material used in addition to syndiotactic 1,2-polybutadiene powder | Maximum number of cycles |
|---|---|---|
| 20 | Liquid 1,2-polybutadiene (molecular weight, 2,000; 1,2-content, 91%). | 7 |
| 21 | Di-2-ethylhexyl phthalate (plasticizer) | 9 |
| 22 | Polypropylene (melt flow rate, 1.0) | 6 |

COMPARATIVE EXAMPLE 5

The procedure of Example 17 was repeated wherein 2,2'-methylenebis(4-methyl-6-tert-butylphenol) was used in place of arylaminomethyl-(3,5-di-tert-butyl-4-hydroxybenzyl) ether with all other conditions remaining the same. The maximum number of cycles of the shaping was only 3.

EXAMPLE 23

The procedure of Example 1 was repeated wherein 1 part of fatty acid diethanolamide ("Dianol 300" made by Daiichi Kogyo Seiyaku K. K., Japan) and 0.5 part of 3,4,5,6 - dibenzo - 2H - 1,2 - oxaphosphorine-2-oxide ("HCA" made by Sanko Chemical K. K., Japan) were used together with 1 part of acrylaminomethyl-3,5-di-tert-butyl-4-hydroxybenzyl) ether with all other conditions remaining the same. The maximum number of cycles of the shaping was 8. The film was pure white after being subjected to shaping 8 times.

EXAMPLE 24

The procedure of Example 6 was repeated wherein 1 part of "Dianol 300" was used together with 1 part of (4-hydroxy-3,5-di-tert-butylbenzyl) acrylate with all other conditions remaining the same. The maximum number of cycles of the shaping was 7.

EXAMPLE 25

The procedure of Example 24 was repeated wherein (4-hydroxy-3,5-di-tert-butylbenzylamino) acrylate was used in place of (4-hydroxy-3,5-di-tert-butylbenzyl) acrylate with all other conditions remaining the same. The maximum number of cycles of the shaping was 6.

EXAMPLE 26

The procedure of Example 6 was repeated wherein 1 part of "dianol 300" and 0.5 part of "HAC" was used together with 1 part of (4-hydroxy-3,5-di-tert-butylbenzyl) acrylate with all other conditions remaining the same. The maximum number of cycles of the shaping was 7. The film was pure white after being subjected to shaping 8 times.

What we claim is:

1. A stabilized 1,2-polybutadiene composition comprising polybutadiene containing at least 30% of a 1,2-structure portion and a stabilizing amount of a compound represented by the formula:

$$\underset{OH}{\overset{R}{\underset{R'}{\bigodot}}}-CH_2-X-\underset{\underset{O}{\overset{\|}{C}}}{\overset{R}{\underset{R''}{C}}}=CH_2 \qquad (I)$$

wherein X is a $-OCH_2NH-$, or $-O-$ group, each of R and R' is an alkyl group having 1-4 carbon atoms and R" is a hydrogen atom or a methyl group.

2. A stabilized 1,2-polybutadiene composition as claimed in claim 1 wherein said polybutadiene containing at least 30% of a 1,2-structure portion is at least one member selected from the group consisting of syndiotactic 1,2-polybutadiene, isotactic 1,2-polybutadiene, rubber-like 1,2-polybutadiene and liquid 1,2-polybutadiene.

3. A stabilized 1,2-polybutadiene composition as claimed in claim 1 wherein said amount of said compound represented by the Formula I is from 0.01 to 10 parts by weight based on 100 parts by weight of said polybutadiene containing at least 30% of a 1,2-structure portion.

4. A stabilized 1,2-polybutadiene composition as claimed in claim 1 wherein said composition further comprises 0.05 to 10 parts by weight, based on 100 parts by weight of said polybutadiene, of a fatty acid diethanolamide represented by the formula:

$$R-CON\begin{matrix}CH_2CH_2OH\\ \\CH_2CH_2OH\end{matrix} \qquad (V)$$

wherein R is an alkyl group having 8 to 20 carbon atoms.

5. A stabilized 1,2-polybutadiene composition as claimed in claim 1 wherein said compound represented by Formula I is acrylaminomethyl-(3,5 - di - tert-butyl-4-hydroxy benzyl) ether.

6. A stabilized 1,2-polybutadiene composition as claimed in claim 1 wherein said compound represented by Formula I is (4-hydroxy-3,5-di-tert-butylbenzyl) acrylate.

7. A stabilized 1,2-polybutadiene composition as claimed in claim 1 wherein said compound represented by Formula I is (4-hydroxy-3,5-di-tert-butylbenzylamino) acrylate.

8. A stabilized 1,2-polybutadiene composition as claimed in claim 1 wherein said compound represented by Formula I is (4-hydroxy-3,5-di-tert-butylbenzyl) methacrylate.

9. A stabilized 1,2-polybutadiene composition as claimed in claim 1 wherein said compound represented by Formula I is (4-hydroxy-3,5 - di - tert - butylbenzylamino) methacrylate.

References Cited
UNITED STATES PATENTS

| | | | |
|---|---|---|---|
| 3,627,831 | 12/1971 | Huber-Emden | 260—45.9 |
| 3,433,835 | 3/1969 | Muller et al. | 260—45.9 |
| 3,313,866 | 4/1967 | Horton et al. | 260—45.85 |
| 3,280,069 | 10/1966 | Knapp et al. | 260—45.85 |
| 2,478,045 | 8/1949 | Hatch et al. | 260—45.85 |
| 3,651,011 | 3/1972 | Schaffhauser et al. | 260—45.95 |
| 3,245,974 | 4/1966 | Angelo | 260—94.2 |
| 3,206,429 | 9/1965 | Broyles et al. | 260—45.9 |
| 3,223,545 | 12/1965 | Gallaugher et al. | 117—139.5 |
| 3,677,965 | 7/1972 | Dexter et al. | 260—45.9 |

DONALD E. CZAJA, Primary Examiner

E. R. RZUCIDLO, Assistant Examiner

U.S. Cl. X.R.

260—23.7 M, 45.85 E, 45.9 NC, 45.95

UNITED STATES PATENT OFFICE
CERTIFICATE OF CORRECTION

Patent No. 3,753,943  Dated August 21, 1973

Inventor(s) Haruo Ueno; Hideo Ishikawa; Hisawaki Hamada; Takashi Watanabe; Kunio Imamura It is certified that error appears in the above-identified patent and that said Letters Patent are hereby corrected as shown below:

The name of one of the co-inventors has been incorrectly designated as "Imamora". This should be corrected to read: --Imamura--.

Further, there should be included as basis for priority, Japan Application No. 89906/71 filed November 12, 1971.

Column 7, line 67: "arylaminomethyl" should read --acrylaminomethyl--.

Signed and sealed this 16th day of July 1974.

(SEAL)
Attest:

McCOY M. GIBSON, JR.
Attesting Officer

C. MARSHALL DANN
Commissioner of Patents